Jan. 12, 1965  G. M. DAVIDSON ETAL  3,164,987
ELECTROSTATIC VIBRATION TRANSDUCER
Filed March 28, 1961

INVENTORS.
GARETH M. DAVIDSON
JACK KRITZ
BY
Raymond A. Paquin
ATTORNEY.

United States Patent Office 3,164,987
Patented Jan. 12, 1965

3,164,987
ELECTROSTATIC VIBRATION TRANSDUCER
Gareth M. Davidson, Bronx, and Jack Kritz, Westbury, N.Y., assignors to American Bosch Arma Corporation, a corporation of New York
Filed Mar. 28, 1961, Ser. No. 98,794
11 Claims. (Cl. 73—141)

The present invention relates to electromechanical frequency-resonant transducers and has particular reference to means for driving the vibrating element therein.

Vibrating string sensors in which changes in the resonant frequency of the string indicate corresponding changes in tension are well known in the art. The tension changes are applied to the string by means compatible with the physical value to be measured. Accelerations, for example, are measured by providing change in tension according to forces on a proof mass adapted to move freely longitudinally of the string. Pressure and temperature may be detected by changes in tension produced by a bellows arrangement acting axially of the string. Previous techniques have used both magnetic and piezoelectric drive to excite natural modes of vibration in the vibrating strings.

In magnetic drives, the vibrating string must be an electrical conductor, thereby restricting the choice of materials and precluding use of strings made of insulating or dielectric materials which possess superior stability characteristics. Also, magnetic drives require a magnetic field to produce the reaction which creates the vibration, thereby resulting in a heavy and bulky device.

In the present invention the vibrating member is driven electrostatically. This results in a number of important advantages over previous driving means. First, an appreciable saving of weight and size is realized since the bulky magnets are not required. Second, there is almost no limitation on the material that may be used for the vibrating string. All metals including magnetic varieties are suitable. All insulators with a dielectric constant greater than that of a vacuum are satisfactory. This last category includes fused quartz which possesses extreme dimensional stability. Third, the power dissipation internally of the transducer using electrostatic vibration is very small. Finally, the circuits inherently bypass the problem of stray capacities and yield a maximum signal to noise ratio. Also, the string may be clamped at its ends the techniques of which have been well explored in the art. Underlying the technique of electrostatic vibration is the physical principle that a force is exerted on an external body tending to pull the body into the plates of a charged capacitor.

In accordance with the invention a pair of electrostatic fields placed side by side are established between two pairs of electrically conducting surfaces. The vibrating element is located on the central plane, midway between the plates, with its longitudinal axis substantially perpendicular to the direction of the electrostatic fields. By varying the strength of one field with respect to the other, the vibrating element is drawn toward the stronger field. If the strengths of the fields are varied at a regular frequency, the vibrating element will be vibrated at the same frequency. If the frequency at which the fields are varied coincides with the natural frequency of the vibrating element, the element will be vibrated at its resonant frequency.

For a more complete understanding of the invention, reference may be had to the accompanying diagrams, in which FIG. 1 shows one mechanical configuration for carrying out the invention.

Figure 1:
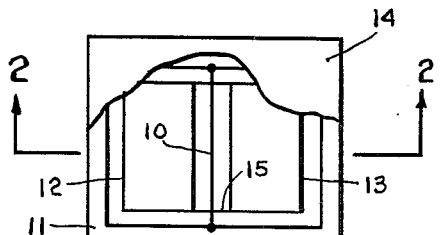
Figure 2:
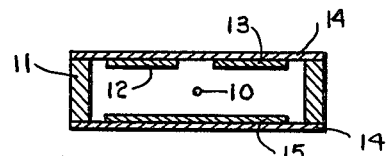
FIG. 2 is a section through 2—2 of FIG. 1.

With reference now to FIGURES 1 and 2, the vibrating element 10 is stretched between the ends of a frame 11. Electrically conducting plates 12 and 13 are located on both sides of the element 10 and slightly above it.

Another electrically conducting plate 15 is located below the element 10 and extends to the outer edges of plates 12 and 13. The element 10 is made of material having electrically insulating or dielectric properties such, for example, as drawn quartz fibre, in the preferred embodiment although metallic elements can also be used if desired.

Figure 3:
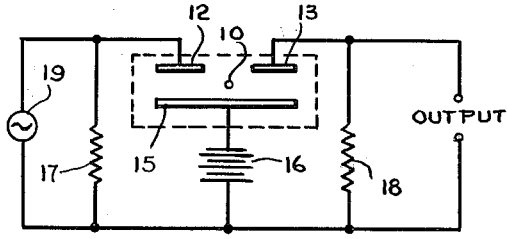
FIG. 3 is a schematic wiring diagram of one method of inducing vibrations.

As shown in FIG. 3, a unidirectional electric field is established between plates 12 and 15 and between plates 13 and 15 by the direct voltage supply 16, the positive end of which is connected to plate 15 and the negative end of which is connected to both plates 12 and 13 through the respective resistors 17 and 18. Plates 12 and 13 are similar, and since the capacitors formed by them and plate 15 have the same potential applied to them the element 10 experiences no net force other than a small force due to structural dysymmetry.

Due to the electrostatic fields between plates 12, 15 and 13, 15 an energy gradient exists in the region between plates 12 and 13. Any body within this region is attracted toward the existing fields by forces corresponding to the energy gradients. If the fields are equal, the energy gradient midway between plates 12, 13 in each direction is the same, so that a body equidistant from plates 12, 13 experiences a net zero force and is not moved in either direction.

If one field is stronger than the other the string 10 in the figures will be drawn toward the stronger field until restrained by the connections of the string 10 to the frame 11. If the field strength is varied periodically by superposition of an alternating field on the constant unidirectional field the string will vibrate about a quiescent position as the string is drawn alternately toward one field or the other.

Generator 19 represents a source of alternating voltage which is applied to capacitor 12–15 periodically adding to and subtracting from the unidirectional voltage across the capacitor. The varying voltage causes a varying force to be applied to string 10 alternately drawing the string 10 into the region between plates 12, 15 or permitting the string 10 to be drawn into the region between plates 13 and 15. Thus, the motion of string 10 corresponds to the variation of voltage across capacitor 12–15 as dictated by generator 19. If the frequency of the generator 19 signal coincides with the natural resonant frequency of string 10, large amplitude excursions of the string are generated.

Due to dysymmetry in structure, the string 10 may not be unstressed in its quiescent position but may be drawn toward one field or the other. To compensate for such effects, the bias fields can be adjusted so as to make the net force on the string in its quiescent state equal to zero. For example, this can be accomplished by interposing a voltage divider (not shown) between the supply 16 and the appropriate resistor 17 or 18.

Motion of the string in the vicinity of plate 13 causes simultaneous variation in the capacity of capacitor 13–15 thereby resulting in a variable voltage across resistor 18 which may be represented by $$RE\frac{dc}{dt}$$

where E is the unidirectional voltage of supply 16, $dc/dt$ describes the time rate of change of the capacity of capacitor 13, 15 and R is the resistance of the resistor 18. This output voltage is a maximum with zero phase shift at the natural resonant frequency of the string 10.

A sinusoidal output voltage is produced in response to a sinusoidal driving signal as long as the amplitude of the A.C. driving signal is no more than ten percent of the D.C. bias voltage. Larger amplitudes may lead to a distorted output signal.

It will be seen that the embodiment shown in FIG. 3 is a three-terminal network having selective resonant properties. It can therefore be used in conjunction with amplifiers to provide an oscillating system whose frequency is closely controlled by the vibrating string characteristics but its use is not limited to transducer art. It may find use in filters, for example, or in constant frequency signal generators as well.

Figure 4:
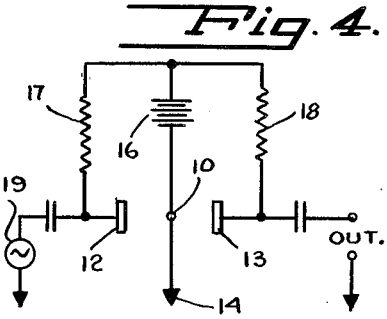
FIG. 4 is a schematic wiring diagram of a push-pull arrangement.

FIGURE 4 shows a modification of FIG. 3 which takes advantage of the greater force of attraction of a charged plate on a body displaced normally therefrom in comparison to the attraction force of the electric field between a pair of plates on a body displaced laterally therefrom. Furthermore, the wire 10 is grounded, giving greater isolation between the input and output circuits.

In this modification plate 15 is removed, and the wire 10 is substituted therefor. The wire 10 is either coated with an electrically conducting metal, or is made entirely of metal and is grounded to an electrically common reference 14. The plates 12, 13 are oriented to be facing one another and are connected to the power supply generator and output terminals as in FIG. 3 or through blocking condensers as shown. Here, as in FIG. 3, the varying field between plate 12 and wire 10 causes vibration of the wire 10, and the resulting varying distance between wire 10 and plate 13 causes an alternating current component in resistor 18 and the voltage thereacross is fed to the output. Blocking condensers prevent establishment of an external D.-C. circuit between supply 16 and ground 14 through either the input or output circuits.

Figure 5:
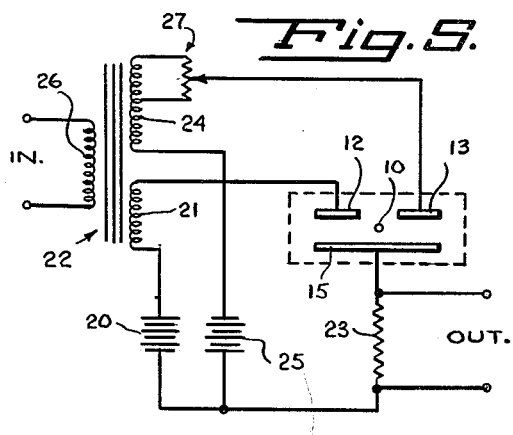
FIG. 5 is a modification of FIG. 4.

In FIG. 5 the unidirectional field across capacitor 12–15 is supplied by battery 20 which is connected in the series circuit including secondary winding 21 of transformer 22 and the common resistor 23 across plates 12 and 15. Similarly the series circuit from plate 13 to plate 15 includes secondary winding 24 of transformer 22 power supply 25 and common resistor 23. The power supplies 20 and 25 are connected in opposite directions so that plate 12 for example is at a higher potential than plate 15 while plate 13 is at a lower potential than plate 15.

The constant and equal electric fields between plates 12, 15 and plates 13, 15 apply equal and opposite forces to string 10 so that the string 10 experiences a zero net force. When an alternating signal is applied to the primary winding 26 of transformer 22, the potentials across plates 12, 15 and across plates 13, 15 vary periodically in opposite phase, i.e., as one field gets stronger, the other gets weaker. Thus, when an A.C. signal is applied to the transformer 22 the vibrating element 10 moves back and forth at the input signal frequency. Simultaneously an alternating current flows in the common impedance element 23 due to the time rate of change of capacitance in the circuit. At the frequency of mechanical resonance both the motion and the voltage output, taken across the common resistor 23, is a maximum.

The upper circuit of FIG. 5 includes a voltage divider 27 interposed between plate 13 and winding 24 which is used to balance the applied A.C. signals.

Figure 6:
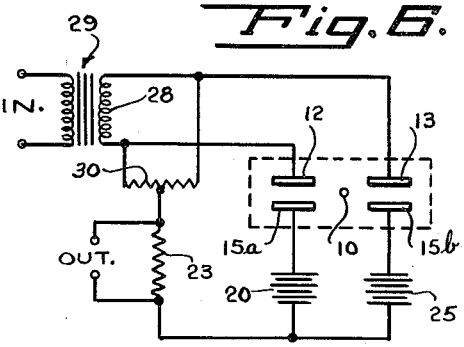
FIG. 6 is a further modification of FIG. 4.

FIG. 6 is a modification of FIG. 5 wherein the plate 15 is split into two halves 15a and 15b in order to permit use of a transformer with a single secondary winding. Here, the secondary winding 28 of transformer 29 is connected directly across plates 12 and 13. Power supplies 20, 25 are connected in series across plates 15a and 15b while the junction of supplies 20, 25 is connected to the midpoint of resistor 30 through resistor 23. Resistor 30 is connected across transformer winding 28 to provide a virtual center tap on winding 28. If actual taps were available, resistor 30 could be eliminated. The output voltage in this circuit is again taken off the common impedance or resistor 23.

The circuits of FIGS. 5 and 6 are inherently balanced to the A.C. signal whence the effects of interelectrode coupling on the output are eliminated. This is not the case in the single ended system of FIGS. 3 and 4, however.

Figure 7:
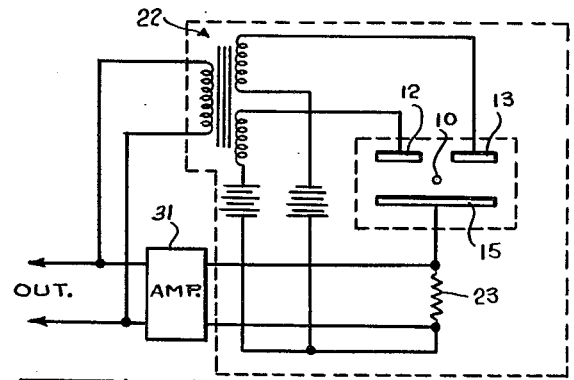

FIG. 7 shows an oscillator using the electrostatic vibration transducer, in which the input of an external driving amplifier 31 is fed by the signal across resistor 23 and its output is connected to transformer 22 or 29 of FIGS. 5 and 6 respectively. The circuit in the dotted rectangle is the same as that in FIG. 5 except that the voltage divider 27 is not shown. With connections as shown in FIG. 7 sustained oscillation will be generated at the mechanical resonant frequency of the transducer providing that the gain of the amplifier 31 is high enough to account for the attenuation in the transducer. In this arrangement, if the tension in string 10 is made to vary according to any variable condition, the frequency of the signal output is a measure of the variable.

We claim:

1. The method of effecting vibration of a member subjected to a tensioning force acting along a predetermined direction therein comprising, providing a pair of electrostatic fields each adjacent a different one of two opposite sides of said member, the lines of force of said electrostatic fields adjacent said member being substantially parallel to each other and substantially normal to said predetermined direction, and cyclically varying the strength of at least one of said fields adjacent said member about a selected value to vibrate said member in a plane substantially perpendicular to said lines of force.

2. The method of effecting vibration of an elongated member under tension comprising, providing a first electrostatic field adjacent one side of said member and a second electrostatic field adjacent the opposite side of said member, the lines of force of said fields adjacent said member being substantially parallel to each other and substantially normal to said member, and varying the strength of said first field adjacent said one side of said member with respect to the strength of said second field adjacent said opposite side of said member to vibrate said member in a plane substantially perpendicular to said lines of force of said fields.

3. The method of obtaining a signal indicative of the magnitude of a force comprising, subjecting a member to a tension along a predetermined direction in response to said force, providing a pair of electrostatic fields adjacent two opposite sides of said member, the lines of force of said fields adjacent said member being substantially parallel to each other and substantially normal to said predetermined direction, varying the strength of one of said fields with respect to the other about a preselected value to vibrate said member in a plane perpendicular to said lines of force, and deriving from at least one of said fields an output signal the frequency of which varies with the frequency of vibration of said member.

4. Vibration-producing apparatus comprising, a member subjected to a tensioning force acting along a predetermined direction therein, means for establishing a pair of electrostatic fields adjacent two opposite sides of said member, the lines of force of said fields adjacent said member being substantially parallel to each other and substantially normal to said predetermined direction, and means for varying the relative values of said fields about a preselected value to vibrate said member in a plane substantially perpendicular to said lines of force.

5. Vibration-producing apparatus comprising, a member subjected to a tension acting along a predetermined direction, means for establishing a pair of electrostatic fields adjacent two opposite sides of said member, the lines of force of said fields adjacent said member being substantially parallel to each other and substantially normal to said predetermined direction, and means for cyclically varying the value of at least one of said fields about a preselected value to vibrate said member in a plane perpendicular to said lines of force.

6. Apparatus for producing vibrations and signals indicative thereof comprising, a member subjected to a tension acting along a predetermined direction, means for establishing a pair of electrostatic fields adjacent two opposite sides of said member, the lines of force of said fields being substantially parallel to each other and substantially normal to said predetermined direction, means for varying the relative values of said fields about a preselected value to vibrate said member in a plane perpendicular to said lines of force, and output circuit means sensitive to at least one of said electrostatic fields for producing an output signal the frequency of which varies with the frequency of vibration of said member.

7. Apparatus for producing vibrations and signals indicative thereof comprising, a member subjected to a tension acting along a predetermined direction, means for establishing a pair of electrostatic fields adjacent two opposite sides of said member, the lines of force of said fields adjacent said member being substantially parallel to each other and substantially normal to said predetermined direction, means for cyclically varying the value of at least one of said fields about a preselected value to vibrate said member in a plane perpendicular to said lines of force, and output circuit means sensitive to at least the other of said electrostatic fields to produce a signal the frequency of which varies with the frequency of vibration of said member.

8. Vibration-producing means comprising, a member subjected to a tension directed along a predetermined direction, means for establishing a pair of electrostatic fields adjacent two opposite sides of said member, said lines of force of said fields adjacent said member being substantially parallel to each other and substantially normal to said predetermined direction, means for varying the relative values of said fields about a preselected value to vibrate said member in a plane perpendicular to said lines of force, output circuit means sensitive to at least one of said electrostatic fields for producing a signal the frequency of which varies with the frequency of vibration of said member, and means for connecting said output circuit means to said means for varying the relative values of said fields to force said member into vibration at its natural frequency.

9. Vibration-producing means comprising, a member subjected to a tension directed along a predetermined direction, means for establishing a pair of electrostatic fields adjacent two opposite sides of said member, said lines of force of said fields adjacent said member being substantially parallel to each other and substantially normal to said predetermined direction, means for varying the value of at least one of said fields about a preselected value to vibrate said member in a plane perpendicular to said lines of force, output circuit means sensitive to at least the other of said electrostatic fields to produce a signal the frequency of which varies with the frequency of vibration of said member, and means for connecting said output circuit means to said means for varying the value of at least one of said fields to force said member into vibration at its natural frequency.

10. Apparatus for producing signals indicative of a variable condition comprising, a member subjected to a tension directed along a predetermined direction, means for establishing a pair of electrostatic fields adjacent two opposite sides of said member, said lines of force of said fields adjacent said member being substantially parallel to each other and substantially normal to said predetermined direction, means for varying the relative values of said fields about a preselected value to vibrate said member in a plane perpendicular to said lines of force, output circuit means sensitive to at least one of said electrostatic fields for producing a signal the frequency of which varies with the frequency of vibration of said member, means for connecting said output circuit means to said means for varying the relative values of said fields to force said member into vibration at its natural frequency, and means for varying said tension in accordance with variations in said condition whereby said signal is indicative of said variable condition.

11. Apparatus in accordance with claim 10, in which said member comprises a longitudinally-tensioned vibratory string element and said means for establishing a pair of electrostatic fields comprises two pairs of electrically conducting surfaces, said pairs of surfaces being located on two opposite sides of said string element.

References Cited in the file of this patent

UNITED STATES PATENTS

| | | |
|---|---|---|
| 2,094,062 | Darlington | Sept. 28, 1937 |
| 2,136,018 | Berr | Nov. 8, 1938 |
| 2,292,790 | Millar | Aug. 11, 1942 |
| 2,657,581 | Fay et al. | Nov. 3, 1953 |
| 2,912,861 | Coyne et al. | Nov. 17, 1959 |
| 2,969,677 | Lewis | Jan. 31, 1961 |
| 3,019,641 | Shapiro | Feb. 6, 1962 |
| 3,036,465 | Dicke | May 29, 1962 |